Dec. 28, 1926.
H. C. BEHR
1,611,989
DRIVING GEAR MECHANISM FOR CENTRIFUGES
Filed April 26, 1926
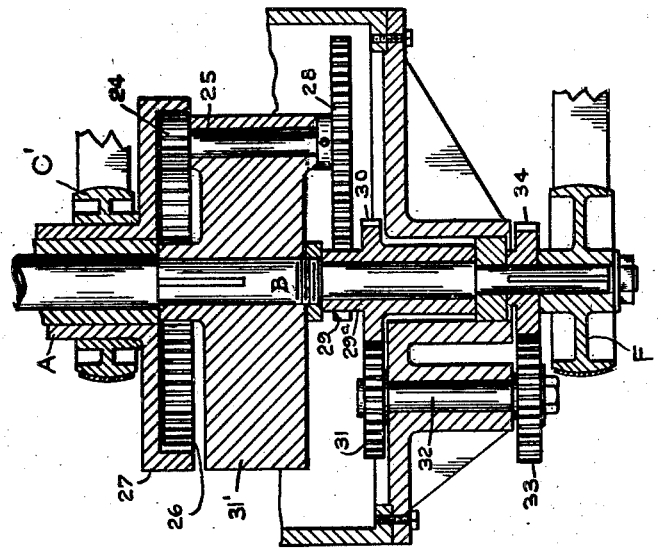
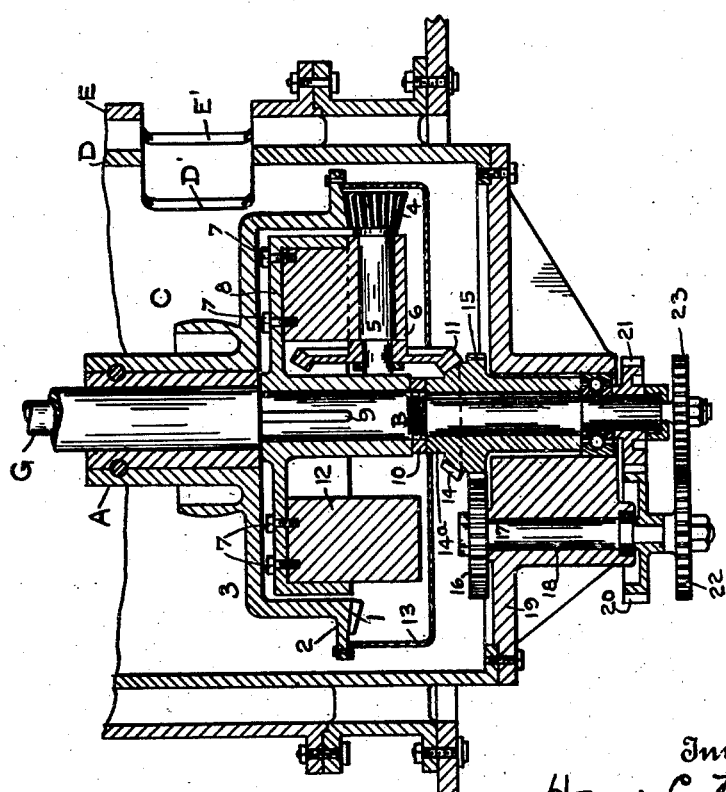
Inventor
Hans C. Behr
By his Attorney S. J. Cox Patented Dec. 28, 1926.

1,611,989

UNITED STATES PATENT OFFICE.

HANS C. BEHR, OF SCARSDALE, NEW YORK.

DRIVING-GEAR MECHANISM FOR CENTRIFUGES.

Application filed April 26, 1926. Serial No. 104,512.

The improvements relate to driving gear adapted to maintain a difference of rotation between the separating and discharging elements of continuous centrifuges. They are in the nature of a modification or improvement in the mechanism described in my copending application Serial No. 84,001, filed January 27, 1926, to which reference may be had for a full description of the parts of the apparatus not herein shown and described or not shown and described herein in detail.

The primary object of the present improvements is to transmit heavy tooth pressure at slow speed and high tooth speed at low pressure in order to reduce vibration, increase the life of the gears, and secure other advantages.

The improvements are illustrated in the accompanying drawings, in which—

Fig. 1 is a sectional elevation of a continuous centrifuge gear system embodying the improvements; and Fig. 2 is a similar view of a modified form of the gearing system shown in Fig. 1.

A slight difference in rotation between the separator shell and the inner shell is obtained through a system of gearing, the heavy load on which is carried by slow moving teeth, while the required higher speed gears are subjected to only very light loads, so that good wear and comparative noiselessness are secured. In the preferred form of the drawing the heavy load is carried by the bevel gear or rack 1, cut on the lower flange 2 of cone 3, which is rigid through quill A with a separator shell, and by the teeth of bevel pinion 4, in mesh with 1 and formed on the outer end of the horizontal shaft 5. Shaft 5 is rotatably mounted in the bearing block 6, secured by bolts 7 to the frame 8, held rigidly in position on shaft B by key 9 and nut 10. To the inner end of shaft 5 is fixed the large bevel gear 11, five times the diameter of bevel pinion 4, so that the pressure on the teeth of gear 11 is one-fifth of that on the teeth of pinion 4. The part of the gear system just described is counterbalanced centrifugally by opposite weights 12 secured on frame 8. A pan 13 serves to close off the air space around the rotating gear system and thus prevent excessive power consumption by fan action, and also prevent oil from being scattered around. The pinion 4 with shaft 5 is caused to rotate at from 36 to 72 R. P. M. by means of additional gearing, and since gear 1 is 12 times the diameter of pinion 4, gear 1 and its shell rigid with it will thus make from 3 to 6 R. P. M. more than bearing block 6, with shaft B and the inner shell all rigid with block 6.

In order to obtain the required R. P. M. of shaft 5 about its own axis the bevel gear 11 is meshed with the bevel pinion 14, which is mounted on shaft B so as to be capable of free rotation thereon. Bevel pinion 14, through the rotary collar 14$^a$, is rigid with spur gear 15, which meshes with an equal sized gear 16, fixed to the upper end of vertical shaft 17, carried in bearings 18 in the base plate 19. To the lower end of shaft 17, so as to be rigid with gear 16, is fixed the spur gear 20, which meshes with another spur gear 21, rigidly fixed to the lower end of shaft B. When bevel gear 1 is rotated at high speed by pulley C, it carries around with it the teeth of bevel pinion 4 and while pressing on said teeth it presses with equal force horizontally against the side of bearing block 6, tending thus to rotate it at the same speed in the same direction with shaft B and the inner shell. But if pinion 4 is rotated about its axis so that its teeth yield by any fixed rate to the pressure of the teeth of gear 1, then evidently block 6 will rotate more slowly than gear 1, and correspondingly the inner shell will rotate more slowly than the outer shell of the separator. If pinion 14 were fixed to base plate 19 so as to be absolutely stationary and nonrotative, then gear 11 and pinion 4 would be rotated about their axis, and block 6 would rotate more slowly than gear 1 by a fixed difference in R. P. M. But such difference in R. P. M. would be far too great for the present purpose, and it is therefore necessary to produce a slower rotation of pinion 4 by causing bevel pinion 14 to rotate at some fixed rate in the direction of bevel gear 1. A difference of from 3 to 6 R. P. M., corresponding to from 36 to 72 R. P. M. of bevel pinion 4, would be obtained by rotation of bevel pinion 14 at from 60 to 120 R. P. M. less than bevel gear 1 in the same direction. If all the spur gears 15, 16, 20 and 21 were of the same size, pinion 4 would remain nonrotative and block 6 with its shell would rotate at the same speed as gear 1 with its shell, there being then no difference in rotation whatever. A difference of 3 R. P. M. would be obtained between the inner and outer shells with gears 15 and 16 of equal size, gear 20 having 49 teeth and gear 21 having 47 teeth. Similarly, 5 R. P. M. between the shells with 15 and 16 equal would be obtained with 62 teeth for gear 20 and 58 teeth for gear 21. For the purpose of varying such differences in rotation, various proportions of gears 20 and 21 can easily be substituted, but it will be necessary to use a variety of pitches, to which, however, there is no objection.

The difference in rotation between shafts B and 17 may be made use of to rotate the central spindle G and the impeller at its upper end at a somewhat slower rate than B by means of the gears 22 and 23 fixed to said respective shafts and the latter gear having a smaller diameter than the former.

By having the pulley C fixed to the cone 3 (apertures D' and E' for a drive belt being provided in the walls D and E of the outer shell), so that it is above the differential gearing, various advantages are attained, due to the fact that the more rapidly rotated shell of the separator is in direct connection with the power and to the fact that it is above the lubricated gears and bearings and not likely to become fouled by the lubricant. In the modified form of Fig. 2, however, a pulley F is keyed to the lower end of the shaft B, and another C' fixed on the quill A.

In the construction in Fig. 2, a pinion 24 corresponding substantially to the pinion 4 of the preferred form, fixed to a vertical shaft 25 meshes with the internal gear or rack 26 of the hood 27. The gear has its bearing in the block 31' keyed to the shaft B. A gear 28 fixed to the lower end of shaft 25 meshes with a pinion 29 on the sleeve 29ª, and is integral through said sleeve with the gear 30 which in turn meshes with a gear 31, of equal size, on the shaft 32. A spur gear 33 is keyed to the lower end of the shaft 32 (the parts 30, 31, 32 and 33 corresponding substantially with the similar parts of the preferred form), and meshes with another spur gear 34 keyed to the shaft B. By this construction the use of bevel gears is avoided.

It will be seen that by the use of the upper pulley, the outer shell of the centrifuge is rotated at the same speed as the pulley, and the inner shell, carried by the shaft B, is rotated at a slightly slower speed, whereas when the lower pulley is used the speed of the inner shell is that of the pulley and the speed of the outer shell slightly greater. It will be understood that both pulleys are not used simultaneously.

While the employment of bevel gears permits a compact and otherwise favorable arrangement of the system of gearing required for the purpose in most cases, the use of spur gearing only may in other cases be advisable.

Various changes in the construction and arrangement of the parts herein described and shown may be made without departing from the scope of the invention. It will also be apparent that the improvements may be used in horizontally or otherwise disposed apparatus as well as in the vertical machine illustrated herein.

I claim:

1. In a gear mechanism for continuous centrifuges, an annular bevel rack adapted to be connected with one rotary element of a centrifuge, means for rotating the said rack and its connected parts, a bevel pinion engaging said annular rack, a shaft mounted in position substantially normal to the axis of rotation of the rack upon which said pinion is fixed, said shaft extending inwardly from said rack toward the axis thereof, a rotary main shaft upon which said rack rotates, said shaft adapted to be connected with another rotary element of the centrifuge, and gear connections between said pinion shaft and said main shaft whereby the rotation of the rack is imparted to the latter at slightly reduced speed.

2. In a gear mechanism for continuous centrifuges, an annular bevel rack adapted to be connected with one rotary element of a centrifuge, means for rotating the said rack and its connected parts, a bevel pinion engaging said annular rack, a shaft mounted in position substantially normal to the axis of rotation of the rack upon which said pinion is fixed, said shaft extending inwardly from said rack toward the axis thereof, a rotary main shaft upon which said rack rotates, said shaft adapted to be connected with another rotary element of the centrifuge, and gear connections between said pinion shaft and said main shaft whereby the rotation of the rack is imparted to the latter at slightly reduced speed, said gear comprising a gear fixed to the pinion shaft, a gear in mesh therewith coaxial with the main shaft and gear connections between said last named gear and said main shaft.

3. In a gear mechanism for continuous centrifuges, an annular bevel rack adapted to be connected with one rotary element of a centrifuge, means for rotating the said rack and its connected parts, a bevel pinion engaging said annular rack, a shaft mounted in position substantially normal to the axis of rotation of the rack upon which said pinion is fixed, said shaft extending inwardly from said rack toward the axis thereof, a rotary main shaft upon which said rack rotates, said shaft adapted to be connected with another rotary element of the centrifuge, and gear connections between said pinion shaft and said main shaft whereby the rotation of the rack is imparted to the latter at slightly reduced speed, said gearing comprising a gear fixed to the pinion shaft, a gear in mesh therewith coaxial with the main shaft, a sleeve surrounding and rotating on the main shaft upon which the last gear is mounted and gear connections between said last-named gear and said main shaft.

4. In a gear mechanism for continuous centrifuges, an annular bevel rack adapted to be connected with one rotary element of a centrifuge, means for rotating the said rack and its connected parts, a bevel pinion engaging said annular rack, a shaft mounted in position substantially normal to the axis of rotation of the rack upon which said pinion is fixed, said shaft extending inwardly from said rack toward the axis thereof, said shaft adapted to be connected with another rotary element of the centrifuge, and gear connections between said pinion shaft and said main shaft whereby the rotation of the rack is imparted to the latter at slightly reduced speed, said gearing comprising a gear fixed to the pinion shaft, a gear in mesh therewith coaxial with the main shaft, said gear connections comprising a gear fixed to said main shaft and a gear in mesh therewith, said gears being removably mounted and replaceable to vary the differential between the rack and the main shaft.

5. In a gear mechanism for continuous centrifuges, an annular bevel rack adapted to be connected with one rotary element of a centrifuge, means for rotating the said rack and its connected parts, a bevel pinion engaging said annular rack, a shaft mounted in position substantially normal to the axis of rotation of the rack upon which said pinion is fixed, said shaft extending inwardly from said rack toward the axis thereof, a rotary main shaft upon which said rack rotates, said shaft adapted to be connected with another element of the centrifuge, and gear connections between said pinion shaft and said main shaft whereby the rotation of the rack is imparted to the latter at slightly reduced speed, a shaft extending through the main shaft and adapted to be connected with a third rotary element of the centrifuge and a gear connection between it and the aforesaid gear connection.

6. In a device of the character described, a main shaft adapted to be connected with a rotary part of a centrifuge, a rotary member connected with said shaft to receive from and impart to said shaft rotation, gears intermediate said member and said shaft for causing a differential in rotation between the two, and driving members adapted to communicate with a source of power to actuate the mechanism, one of said members being fixed to said shaft and one attached with said first-named rotary member.

7. In a device of the character described, an annular rack, connections with a source of power for rotating the same, a pinion in mesh with said rack, a rotary main shaft coaxial with said rack, a shaft on which said pinion is fixed and a member fixed to said main shaft on which said pinion shaft is mounted on a revolving axis, said main shaft being mounted to have relative rotary movement, and gear connections between said pinion and the main shaft whereby a differential is maintained between the rotation of said shaft and the rack.

8. In a device of the character described, an annular rack, connections with a source of power for rotating the same, a pinion in mesh with said rack, a rotary main shaft coaxial with said rack, a shaft on which said pinion is fixed and a member fixed to said main shaft on which said pinion shaft is mounted on a revolving axis, said main shaft being mounted to have relative rotary movement, and gear connections between said pinion and the main shaft whereby a differential is maintained between the rotation of said shaft and the rack, said gear connections comprising removable and replaceable gears for varying the differential.

9. In a device of the character described, an annular rack, connections with a source of power for rotating the same, a pinion in mesh with said rack, a rotary main shaft coaxial with said rack, a shaft on which said pinion is fixed and a member fixed to said main shaft on which said pinion shaft is mounted on a revolving axis, said main shaft being mounted to have relative rotary movement, and gear connections between said pinion and the main shaft whereby a differential is maintained between the rotation of said shaft and the rack, a shaft extending through said main shaft and adapted to be connected with another rotary element of the centrifuge, and gear connections between said shaft and the aforesaid gear connections whereby the last named shaft may be given a different rate of rotation from that of the main shaft within the said main shaft.

Witness my hand this 20th day of April, 1926, at the city of New York, State of New York, county of New York.

HANS C. BEHR.